United States Patent
Chase

(10) Patent No.: US 9,988,101 B2
(45) Date of Patent: Jun. 5, 2018

(54) DECORATIVE ASSEMBLY FOR AN AUTOMOBILE AND A METHOD OF MANUFACTURING SAME

(71) Applicant: Lacks Enterprises, Inc., Grand Rapids, MI (US)

(72) Inventor: Lee A. Chase, Grand Rapids, MI (US)

(73) Assignee: Lacks Enterprises, Inc., Grand Rapids, MI (US)

( * ) Notice: Subject to any disclaimer, the term of this patent is extended or adjusted under 35 U.S.C. 154(b) by 259 days.

(21) Appl. No.: 14/065,564

(22) Filed: Oct. 29, 2013

(65) Prior Publication Data

US 2015/0118442 A1 Apr. 30, 2015

(51) Int. Cl.
| | |
|---|---|
| *B62D 29/04* | (2006.01) |
| *B62D 29/00* | (2006.01) |
| *B29C 45/00* | (2006.01) |
| *B29C 45/37* | (2006.01) |
| *B60R 13/02* | (2006.01) |
| *B60R 13/04* | (2006.01) |

(Continued)

(52) U.S. Cl.
CPC .......... *B62D 29/043* (2013.01); *B29C 45/006* (2013.01); *B29C 45/0055* (2013.01); *B29C 45/372* (2013.01); *B60R 13/02* (2013.01); *B60R 13/04* (2013.01); *B62D 29/005* (2013.01); *B29L 2031/30* (2013.01); *B29L 2031/3041* (2013.01); *B29L 2031/722* (2013.01); *B60R 2013/0281* (2013.01); *Y10T 428/24355* (2015.01); *Y10T 428/24612* (2015.01); *Y10T 428/24752* (2015.01)

(58) Field of Classification Search
CPC .... B62D 29/043; B62D 29/005; B60R 13/04; B60R 13/02; B60R 2013/0281; B29L 2031/30; B29L 2031/722; B29L 2031/3041
See application file for complete search history.

(56) References Cited

U.S. PATENT DOCUMENTS

| | | | | |
|---|---|---|---|---|
| 4,801,479 | A * | 1/1989 | Fielder | B05D 1/30 156/242 |
| 6,468,672 | B1 * | 10/2002 | Donovan, III | C25D 5/14 205/169 |

(Continued)

FOREIGN PATENT DOCUMENTS

EP 1344688 9/2003

*Primary Examiner* — Laura A Auer
(74) *Attorney, Agent, or Firm* — John S. Artz; Dickinson Wright PLLC

(57) ABSTRACT

A decorative assembly (20) includes a translucent part (26) overlaying a portion of a chromed visible surface (24) of a base part (22) to define a first visible portion (28) of the chromed visible surface (24) not covered by the plastic layer and a second visible portion (30) of the chromed visible surface (24) covered by but visible through the translucent part (26) for allowing the chromed visible surface (24) to be freely exposed along the first visible portion (28) and for allowing light to pass through the translucent part (26) and reflect off the second visible portion (30) of said chromed visible surface (24). At least one of the second visible portion (30) of the chromed visible surface (24) or the translucent part (26) includes a three-dimensional texture (32) to redirect the light reflected off the second visible portion (30) of the chromed visible surface (24).

18 Claims, 9 Drawing Sheets

(51) Int. Cl.
*B29L 31/30* (2006.01)
*B29L 31/00* (2006.01)

(56) References Cited

U.S. PATENT DOCUMENTS

| | | |
|---|---|---|
| 7,036,873 B2 | 5/2006 | Pommeret et al. |
| 2006/0086620 A1* | 4/2006 | Chase .................... B44C 1/227 |
| | | 205/164 |
| 2007/0207310 A1* | 9/2007 | Storey ................... B05D 5/068 |
| | | 428/336 |
| 2008/0111419 A1* | 5/2008 | Stahel ..................... B60B 7/006 |
| | | 301/37.41 |
| 2010/0167026 A1 | 7/2010 | Hayes |

* cited by examiner

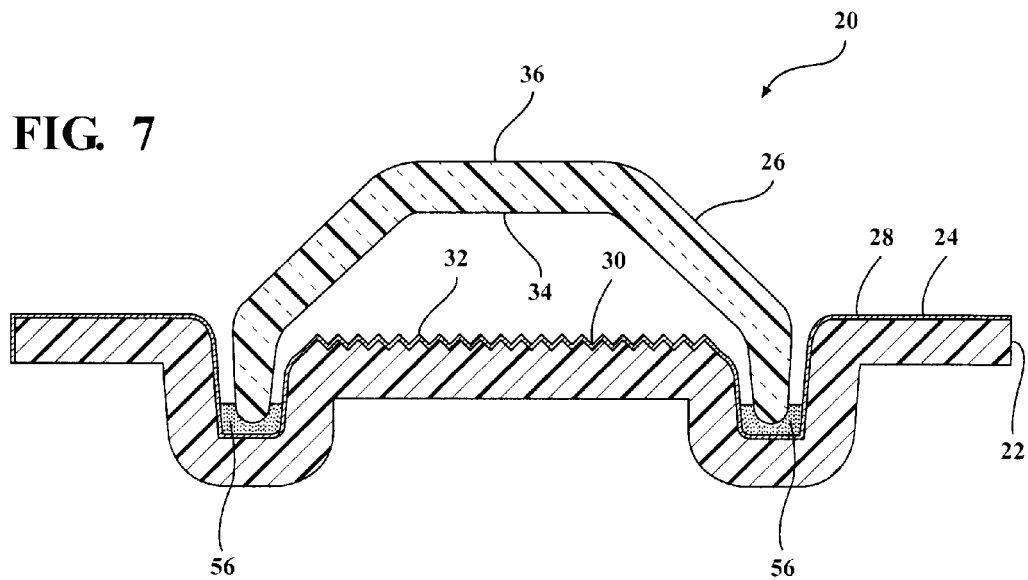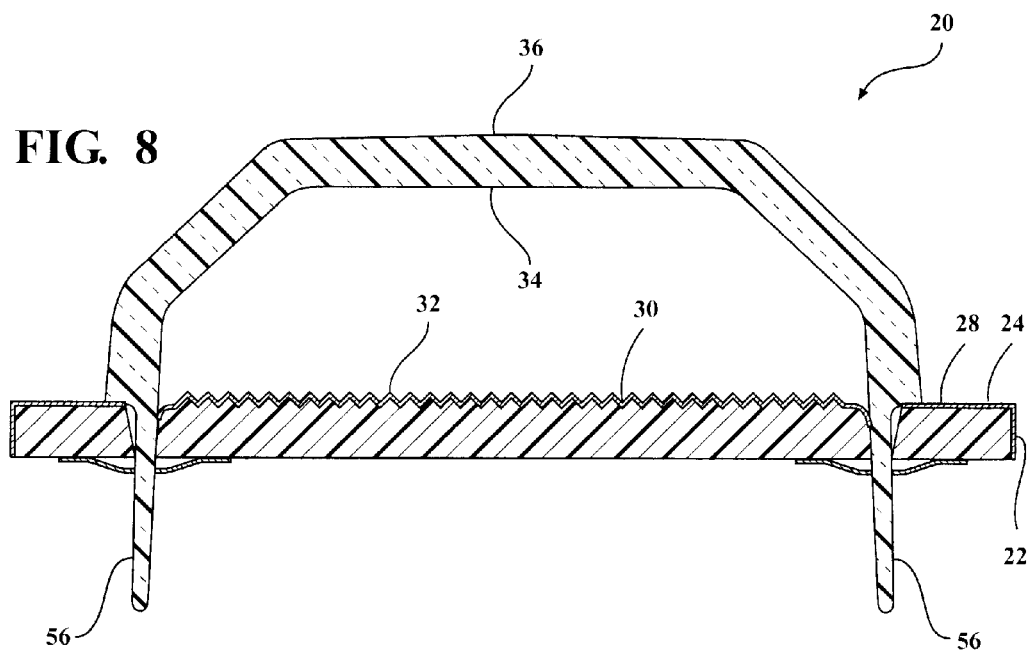

DECORATIVE ASSEMBLY FOR AN AUTOMOBILE AND A METHOD OF MANUFACTURING SAME

BACKGROUND OF THE INVENTION

1. Field of the Invention

A decorative assembly for an automobile as well as a method of manufacturing same.

2. Description of the Prior Art

The decorative assemblies to which the subject invention pertains are automobile parts such as automotive grilles, wheel covers, claddings, interior bezels or the like. Examples of such decorative assemblies are disclosed in U.S. Pat. No. 7,036,873 to Pommeret, et al; US 2010/0167026 to Hayes; and EP 1344688 to Munro. Although the prior art decorative assemblies present aesthetic surfaces to a driver or observer of the automobile, there still remains a need for a decorative assembly which can provide more degrees of freedom to designers and/or manufacturers with regard to the optical effects that can be achieved by the decorative assemblies. In addition, there remains a need for a decorative assembly, as well as a method of manufacturing same, which reduces the overall part and manufacturing costs, while correspondingly increasing the asthetic effects that can achieved by the resultant decorative assembly.

SUMMARY OF THE INVENTION

The subject disclosure provides for a decorative assembly which includes a translucent part overlaying a portion of a chromed visible surface of a base part. The decorative assembly includes a first visible portion of the chromed visible surface not covered by the translucent part and a second visible portion of the chromed visible surface covered by but visible through the translucent part. The resultant first and second visible portions created by the translucent part leaves the chromed visible surface to be freely exposed along the first visible portion of the decorative assembly while simultaneously allowing light to pass through the translucent part and reflect off the second visible portion of the chromed visible surface lying beneath the translucent part. The combination of the first and second visible portions of the chromed visible surface provides two separate aesthetic characteristics to the decorative assembly with minimal additional parts or manufacturing processes. As a result, the subject disclosure improves the aesthetic effects of chromed decorative assemblies with minimal additional manufacturing or part costs. Put another way, the combination of a translucent part overlaying only a portion of the chromed visible surface provides for unique decorative effects which can be accomplished with minimal additional parts or manufacturing processes.

BRIEF DESCRIPTION OF THE DRAWINGS

Other aspects of the present disclosure will be readily appreciated, as the same becomes better understood by reference to the following detailed description when considered in connection with the accompanying drawings wherein:

FIG. 7 is a third aspect of the attachment means;

FIG. 8 is a fourth aspect of the attachment means;

DESCRIPTION OF THE ENABLING EMBODIMENTS

Figure 1:
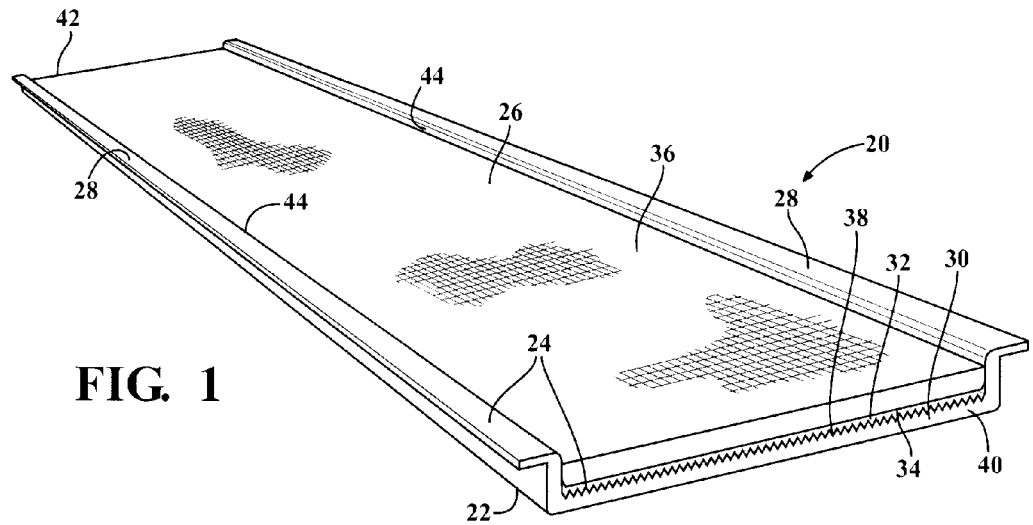
FIG. 1 is a perspective view of a first aspect of a decorative assembly showing a translucent part overlaying a portion of a chromed base part.

Referring to the Figures, wherein like numerals indicate corresponding parts throughout the several views, a decorative assembly 20 for an automobile includes, but is not limited to, automotive grilles, wheel covers, claddings, interior bezels, and the like. Obviously, other decorative assemblies may also be employed. As used herein, the term automobile includes any type of vehicle, such as a car, truck, or the like. The decorative assembly 20 includes a base part 22 comprised of a plastic material such as acrylonitrile butadiene styrene (ABS) or a polycarbonate-acrylonitrile butadiene styrene blend (PC/ABS). The base part 22 has a visible surface 24 and, according to an aspect, also has a wall thickness of approximately 2 mm to 4 mm. Other types of material and other thicknesses may be employed. The term visible surface 24 as used herein is used to describe a surface or portion of the decorative assembly 20 that will ultimately be viewable, and thus capable of being observed, by a driver or observer of the automobile once installed on the respective portion of the automobile. The decorative assembly 20 also includes a chrome layer disposed on all of the visible surface 24 of the base part 22 to create a chromed visible surface 24 of the base part 22. Put another way, the chrome layer covers the entirety of the visible surface 24 of the base part 22 to provide a shiny, bright, and highly reflective chromed visible surface 24 for the decorative assembly 20.

The decorative assembly 20 also includes a translucent part 26 which overlays a portion of the chromed visible surface 24 of the base part 22. This translucent part 26 helps define a first visible portion 28 of the chromed visible surface 24 that is not covered by the translucent part 26 as well as a second visible portion 30 of the chromed visible surface 24 which is covered by but is still visible through the translucent part 26. Put another way, the second visible portion 30 of the chromed visible surface 24 can still be partially viewed or perceived through the translucent or clear part 26. According to an aspect, the translucent part 26 is injection molded and may be comprised of a plastic material such as a polycarbonate or acrylic material. According to an aspect, the translucent part 26 also has a wall thickness of approximately 2 mm to 4 mm. However, other materials which exhibit or provide translucent or clear properties to the translucent part 26, as well as other thicknesses of the translucent part 26, can be substituted without departing from the disclosure.

As mentioned above, the first and second visible portions 28, 30 of the chromed visible surface 24 created by the translucent part 26 allows the chrome layer applied to the base part 22 to be freely exposed along the first visible portion 28 while simultaneously allowing light to pass through the translucent part 26 and reflect off the second visible portion 30 of the chromed visible surface 24. According to an aspect, at least one of the second visible portion 30 of the chromed visible surface 24 or the translucent part 26 includes a three-dimensional texture 32 disposed thereon to redirect the light that is reflected off the second visible portion 30 of the chromed visible surface 24. As a result, two separate aesthetic characteristics are provided to the decorative assembly 20 by the chromed visible surface 24. In one instance, the first visible portion 28 of the chromed visible surface 24 is freely visible or exposed on the decorative assembly 20 and thus freely reflects light which is uninhibited or uninterrupted by another surface or part, such as the translucent part 26. As such, the first visible portion 28 exhibits a shiny, bright, and highly reflective chromed visible surface 24. In a second instance, the second visible portion 30 of the chromed visible surface 24 reflects light that has passed through the translucent part 26, which is then redirected off the three-dimensional texture 32 to contribute an aesthetic characteristic to the decorative assembly 20 which is separate and distinct from the first visible portion 28. As noted above, the three-dimensional texture 32 can be disposed along or on one of the second visible portion 30 of the chromed visible surface 24 or the translucent part 26.

According to another aspect, the translucent part 26 can be a colored translucent part to provide color to the light that is reflected off the second visible portion 30 of the chromed visible surface 24. As a result, according to this aspect, two separate aesthetic characteristics are also provided to the decorative assembly 20 by the chromed visible surface 24. In one instance, the first visible portion 28 of the chromed visible surface 24 is freely visible or exposed on the decorative assembly 20 and thus freely reflects light which is uninhibited or uninterrupted by another surface or part, such as the colored translucent part 26. As such, the first visible portion 28 exhibits a shiny, bright, and highly reflective chromed visible surface 24. In a second instance, the second visible portion 30 of the chromed visible surface 24 reflects light that has color added to it by way of the colored translucent part 26 to contribute an aesthetic characteristic to the decorative assembly 20 which is separate and distinct from the first visible portion 28. Put another way, the colored translucent part 26 contributes a color to the second visible portion 30 of the chromed visible surface 24. In this aspect, the colored translucent part 26 could also be coupled with the three-dimensional texture 32 that is disposed along one of the second visible portion 30 of the chromed visible surface 24 or the translucent part 26 to further enhance the asthetic characteristics provided to the decorative assembly 20.

Figure 2:
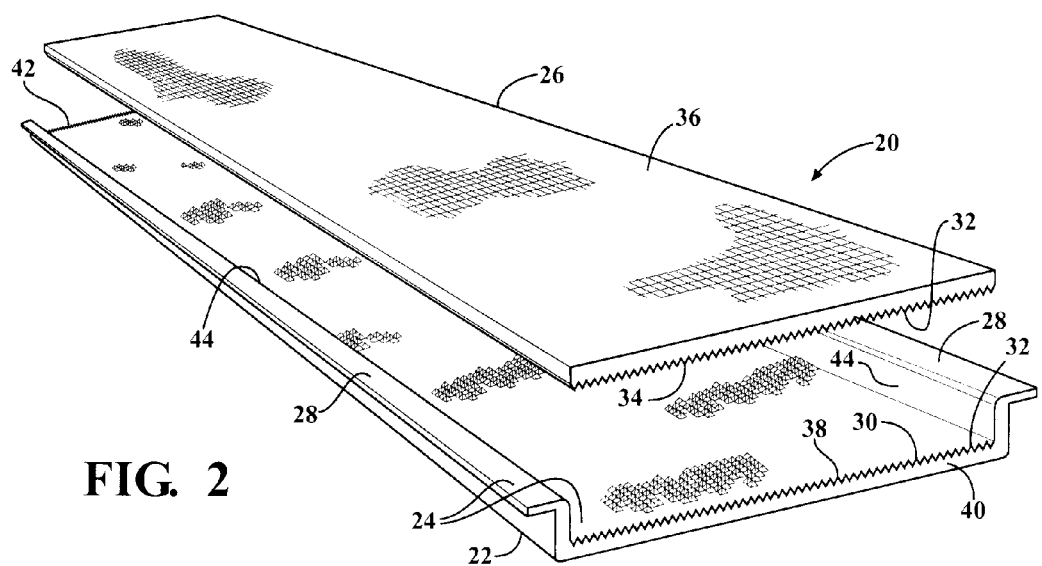
FIG. 2 is an exploded perspective view of the first aspect showing the base part including a channel and a pair of raised edges.
Figure 3:
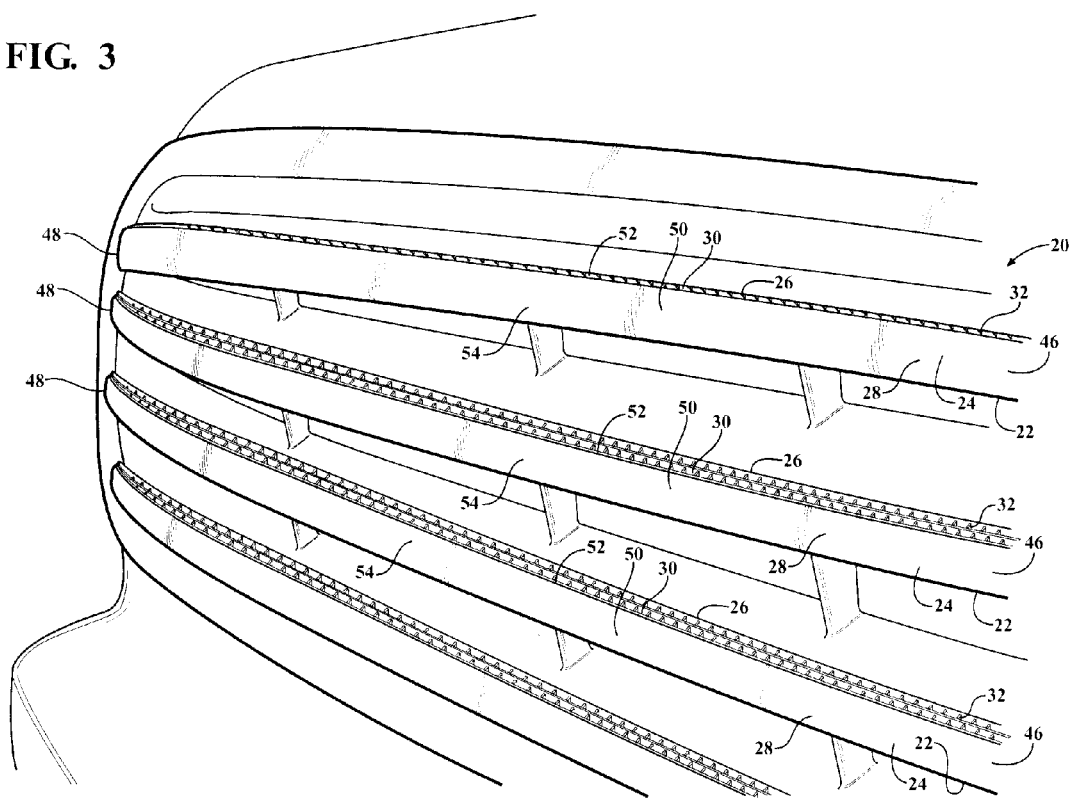
FIG. 3 is a perspective view of a second aspect of the decorative assembly.

The three-dimensional texture 32 of the decorative assembly 20 can be implemented in various ways. However, all of the implementations of the three-dimensional texture 32 share a common feature in that they redirect light either consecutively with or subsequently after the light has been reflected off the second visible portion 30 of the chromed visible surface 24. In one implementation, as best shown in FIGS. 1 and 3, the three-dimensional texture 32 can include an array of prisms disposed within or along the translucent part 26. In a second implementation, as best shown in FIG. 2, the translucent part 26 can include a bottom portion 34 which extends in spaced and adjacent relationship with the second visible portion 30 of the chromed visible surface 24 and a top portion 36 which extends in opposing relationship with the bottom portion 34. Put another way, the top portion 36 extends in spaced and parallel relationship with the bottom portion 34. In this implementation, the three-dimensional texture 32 comprises a textured surface disposed along one of the bottom or top portions 34, 36 of the translucent part 26. In yet another implementation, the three-dimensional texture 32 comprises a three-dimensional textured surface disposed along the second visible portion 30 of the chromed visible surface 24. In any of these implementations, the three-dimensional texture can be machined, laser etched, or chemically etched into the metal mold with which the translucent part 26 or the base part 22 is injection molded into. Put another way, the three-dimensional texture 32 can be transferred to either the base part 22 or the translucent part 26 during the injection molding process used to make these respective parts. In all of the textured surface implementations of the three-dimensional texture 32, the three-dimensional textured surface can range from very minute in depth or shape to relative large in depth and shape.

The mating or joining of the base part 22 and the translucent part 26 can be achieved through a variety of assembly techniques. For example, as best shown in FIG. 2, in one aspect, the base part 22 of the decorative assembly 20 can include a channel 38 extending from a first channel end 40 to a second channel end 42, as well as a pair of raised edges 44 each of which extend between the first and second channel end 40, 42 in parallel and raised relationship to the channel 38. As best shown in FIG. 1, the translucent part 26 can then be laid within the channel 38 between the raised edges 44 to define the first visible portion 28 of the chromed visible surface 24 disposed along the raised edges 44 of the base part 22 and the second visible portion 30 of the chromed visible surface 24 disposed along the channel 38. In this aspect, the translucent part 26 can extend between first and second channel ends 40, 42 and also be disposed in abutting relationship with the raised edges 44. As shown in FIGS. 1 and 2, this assembly technique works well when the decorative assembly 20 is an interior bezel. Obviously, this assembly technique can also be employed with other decorative assemblies.

In another aspect of an assembly technique, as best shown in FIG. 3, the base part 22 can include a plurality of bars 50 extending in spaced relationship to one another from a first bar end 46 to a second bar end 48 to define a top side 52 and a front side 54 on each of the bars 50. The translucent part 26 is disposed along the top side 52 of the bars 50 between the first bar end 46 and the second bar end 48 to define the first visible portion 28 of the chromed visible surface 24 disposed along the front side 54 of the plurality of bars 50 and the second visible portion 30 of the plurality of bars 50 disposed along the top side 52 of the plurality of bars 50. As shown in FIG. 3, this assembly technique works well when the decorative assembly 20 is an automotive grille and the top side 52 of the bars 50 are disposed in a horizontal arrangement while the front side 54 of the bars are disposed in a vertical arrangement. Obviously, this assembly technique can also be employed with other decorative assemblies.

Figure 5:
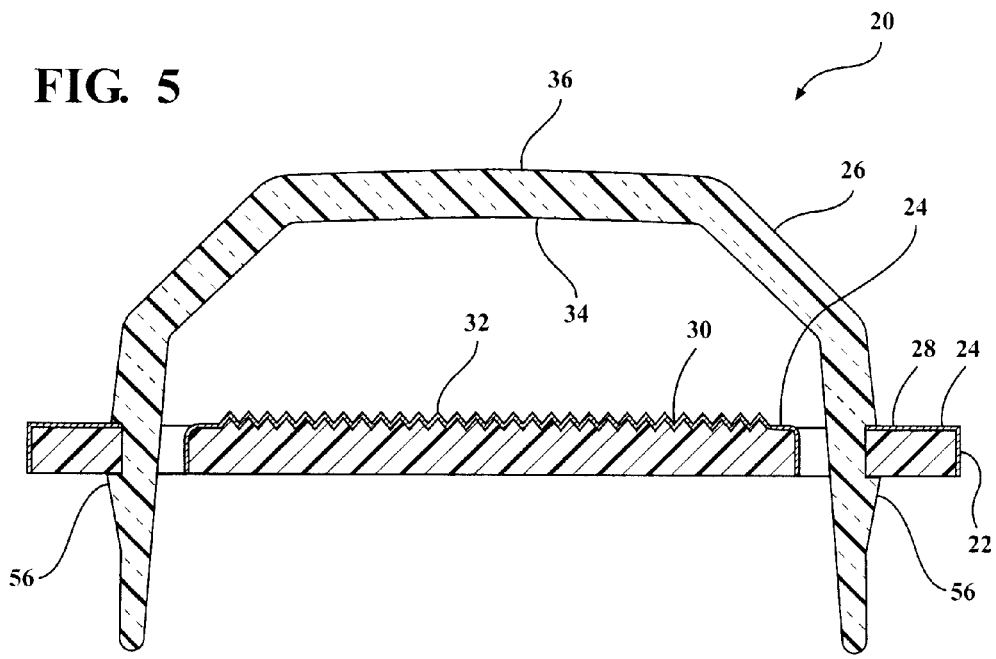
FIG. 5 is a first aspect of an attachment means to establish interlocking relationship between the base part and the translucent part.
Figure 6:
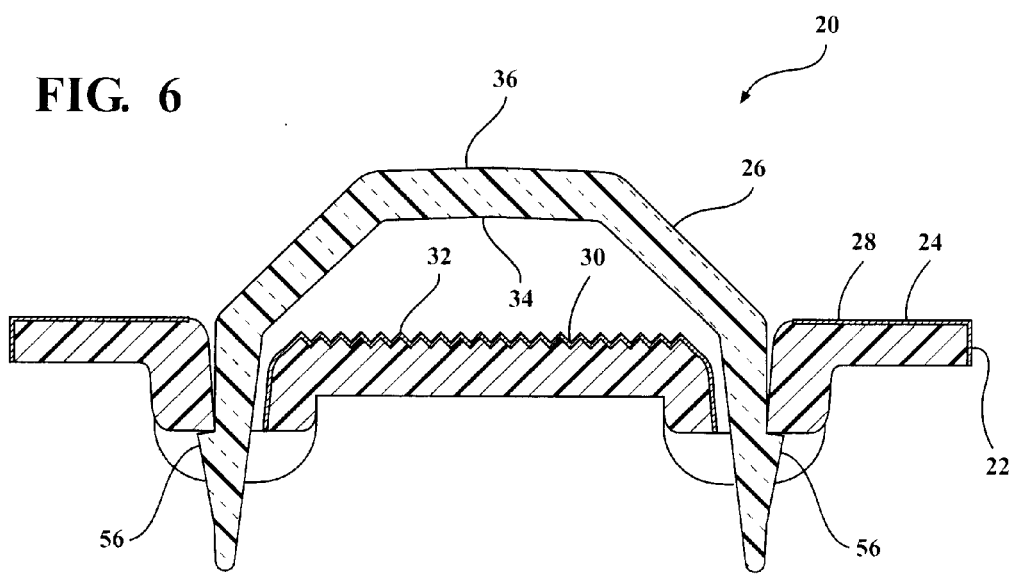
FIG. 6 is a second aspect of the attachment means.
Figure 9:
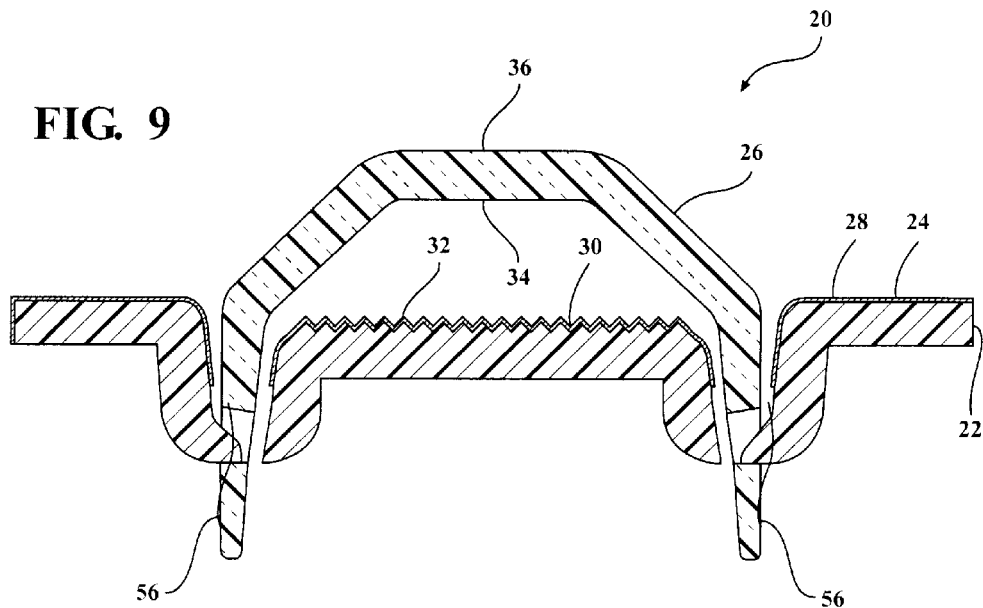
FIG. 9 is a fifth aspect of the attachment means.
Figure 10:
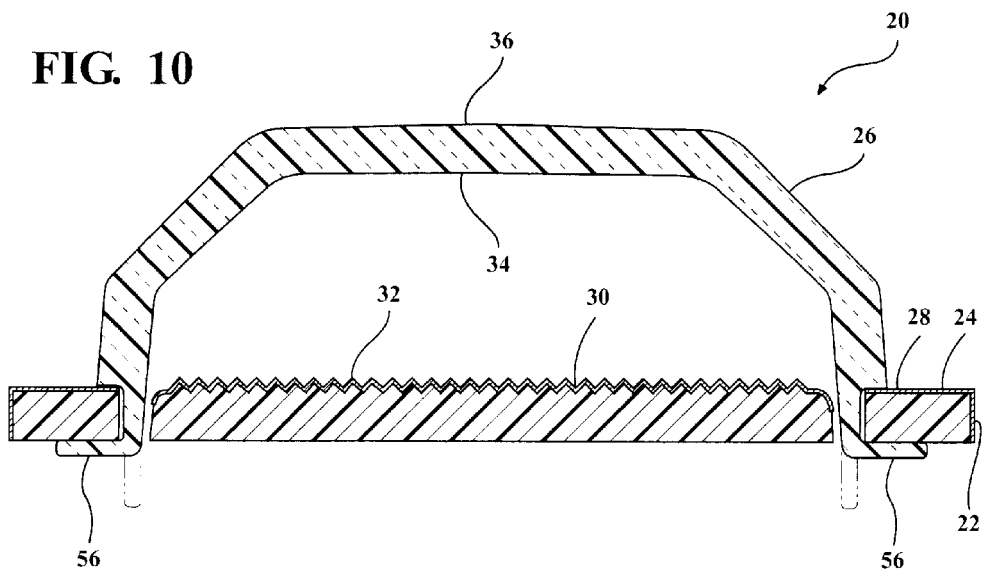
FIG. 10 is a sixth aspect of the attachment means.
Figure 11:
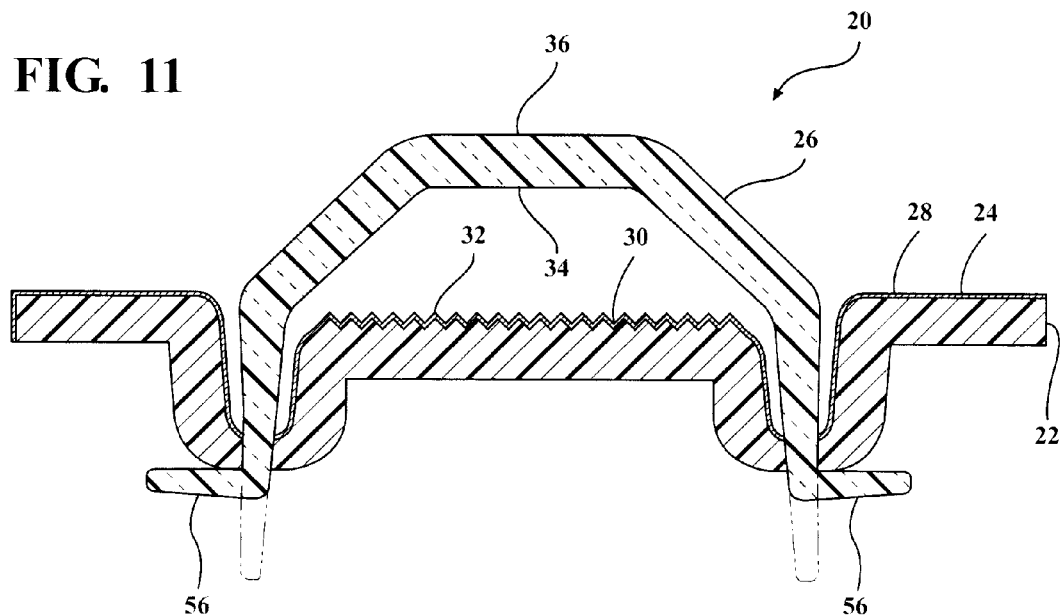
FIG. 11 is a seventh aspect of the attachment means.
Figure 12:
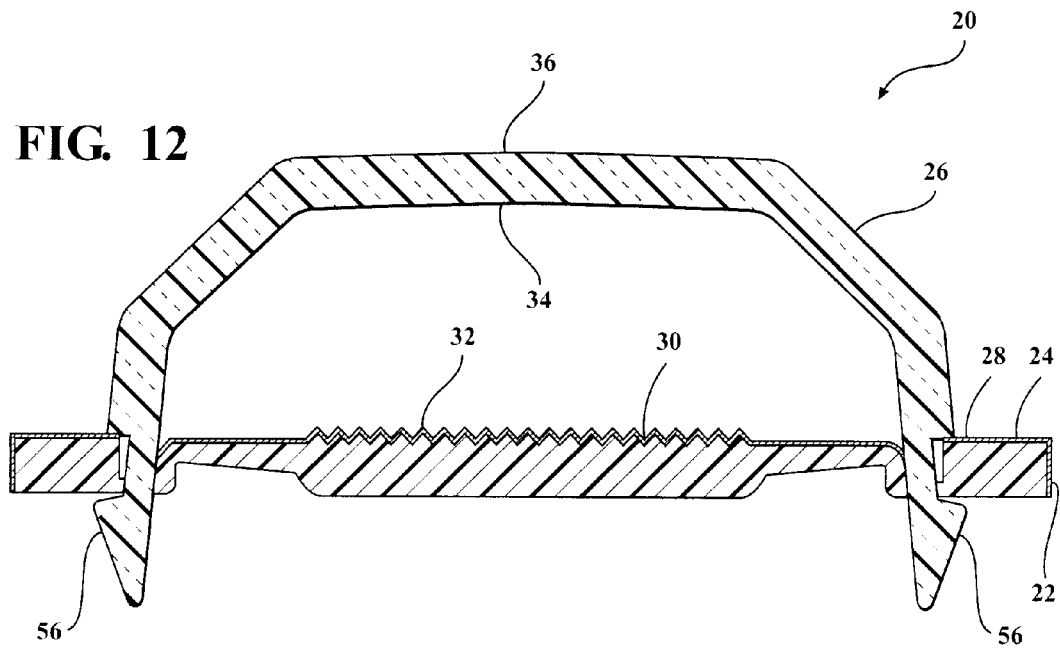
FIG. 12 is an eighth aspect of the attachment means.
Figure 13:
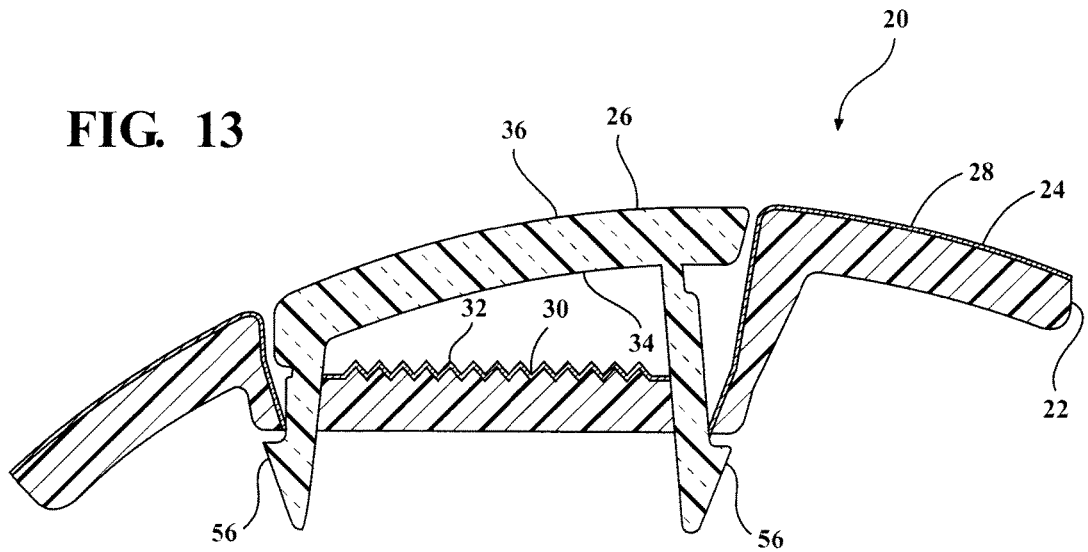
FIG. 13 is a ninth aspect of the attachment means.
Figure 14:
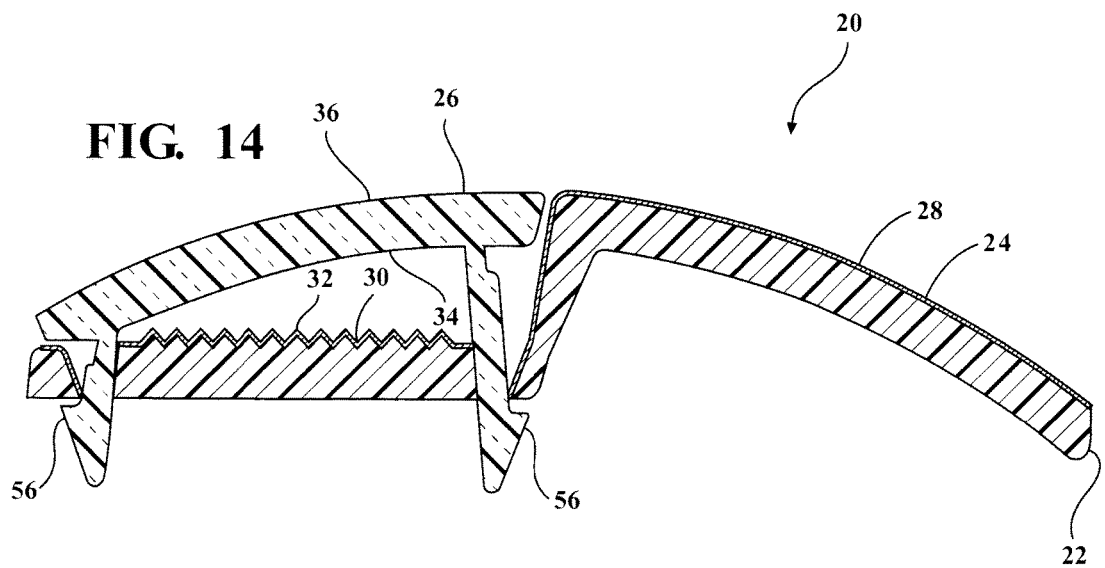
FIG. 14 is a tenth aspect of the attachment means.
Figure 15:
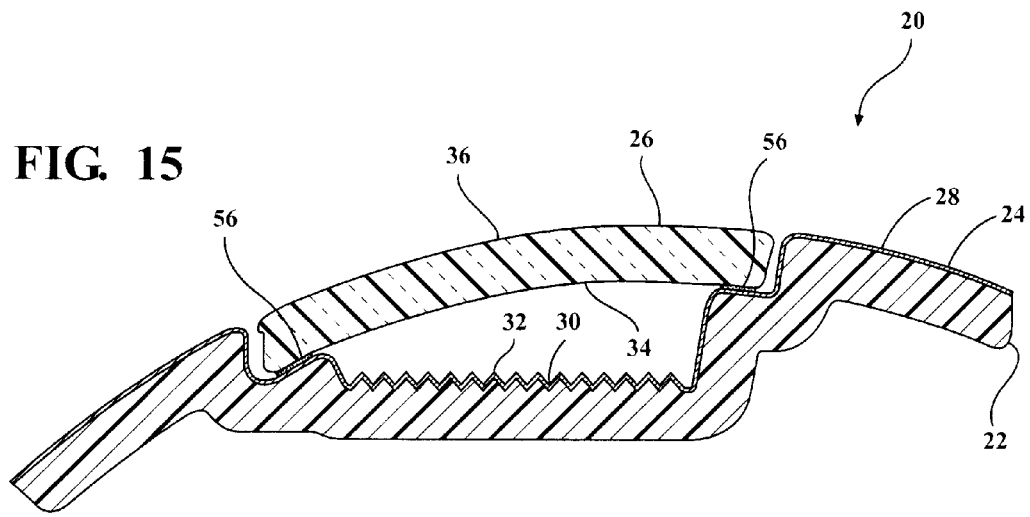
FIG. 15 is a eleventh aspect of the attachment means.
Figure 16:
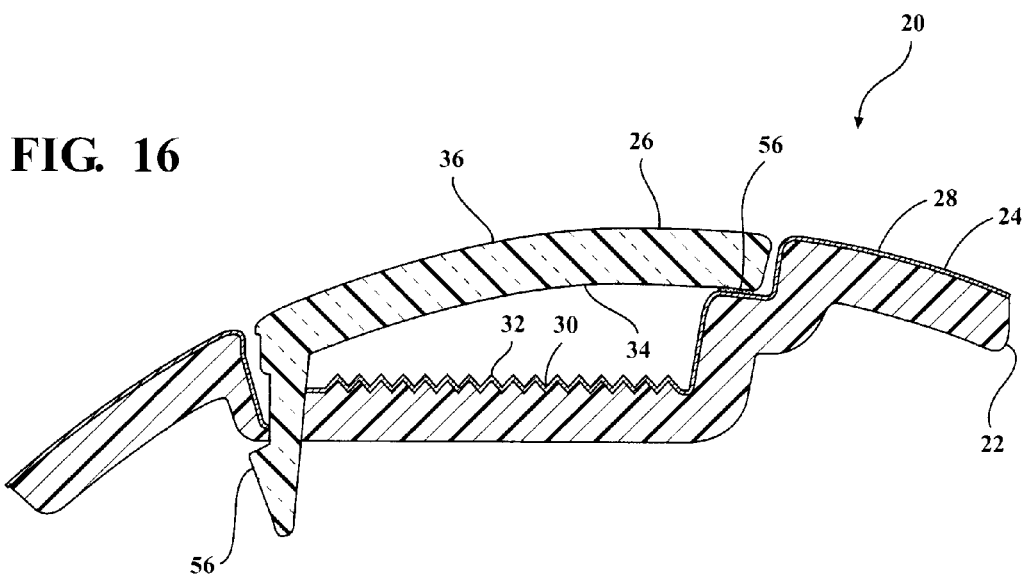
FIG. 16 is a twelfth aspect of the attachment means.

In any of the assembly techniques, an interlocking means 56 may be used to establish interlocking relationship between the base part 22 and the translucent part 26. In the preferred aspect, the interlocking means comprises at least one of snap tabs, glue, a sonic weld, double-sided tape, buckle clips, heat stakes, a rib with metal clips, hoops, or the like. For example, as best shown in FIGS. 5-6, the interlocking means 56 comprises a buckle clip to establish interlocking relationship between the base part 22 and the translucent part 26. Alternatively, as best shown in FIG. 7, the interlocking means 56 comprises glue to establish interlocking relationship between the base part 22 and the translucent part 26. Alternatively, as best shown in FIG. 8, the interlocking means 56 comprises a rib with a metal clip to establish interlocking relationship between the base part 22 and the translucent part 26. Alternatively, as best shown in FIG. 9, the interlocking means 56 comprises a hoop to establish interlocking relationship between the base part 22 and the translucent part 26. Alternatively, as best shown in FIGS. 10-11, the interlocking means 56 comprises a heat stake to establish interlocking relationship between the base part 22 and the translucent part 26. Alternatively, as best shown in FIGS. 12-14, the interlocking means 56 comprises a snap tab to establish interlocking relationship between the base part 22 and the translucent part 26. Alternatively, as best shown in FIG. 15, the interlocking means 56 comprises double-sided tape to establish interlocking relationship between the base part 22 and the translucent part 26. Alternatively, as best shown in FIG. 16, the interlocking means 56 comprises double sided tape in combination with snap tabs to establish interlocking relationship between the base part 22 and the translucent part 26. However, any other interlocking means can also be utilized to interlock the base part 22 and the translucent part 26 without departing from the scope of the disclosure.

Figure 4:
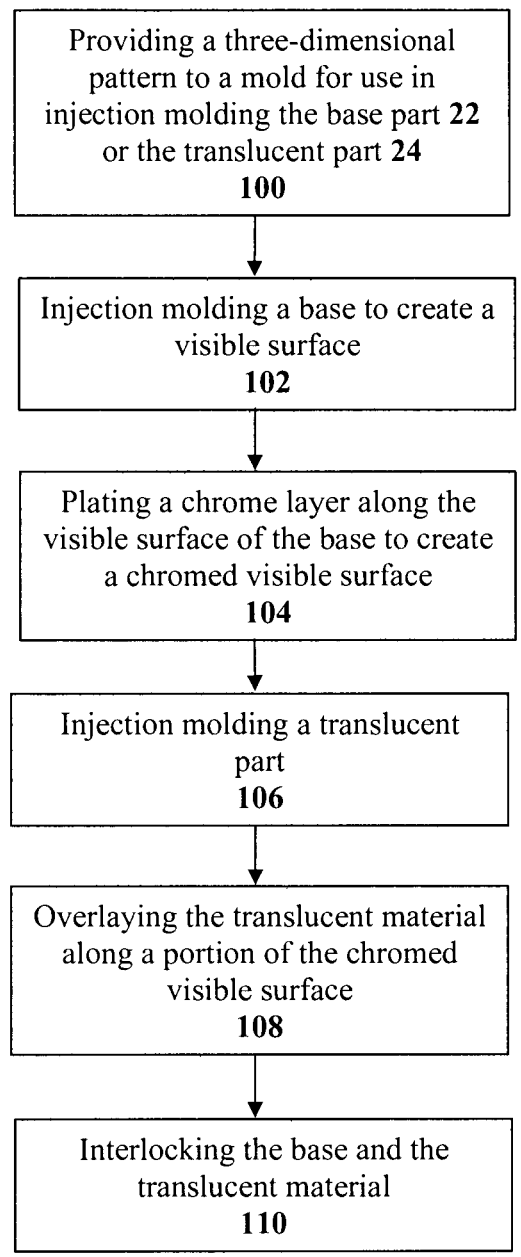
FIG. 4 is a flow diagram of a method of manufacturing a decorative assembly.

With reference to FIG. 4, a method of manufacturing a decorative assembly 20 for an automobile begins by 100 providing an optical or three-dimensional pattern to a mold for use in molding the base part 22 or the translucent part 24. As mentioned above, the step 100 can include machining, laser etching, or chemically etching a metal mold with which the translucent part 26 or the base 22 is injection molded into. As a result, the three-dimensional texture 32 will be transferred to either the base 22 or the translucent part 26 during the injection molding process used to make these respective parts.

The method proceeds by 102 injection molding a base 22 to create a visible surface 24 of the base 22, with the injection molded base 22 comprised of preferably ABS or PC/ABS. The method proceeds by 104 plating a chrome layer along all of the visible surface 24 of the base 22 to create a chromed visible surface 24. The method proceeds by 106 injection molding a translucent part 26. As a result, the method results in at least one of the second visible portion 30 of the chromed visible surface 24 and the translucent material 26 having a three-dimensional texture 32.

The method proceeds by 108 overlaying the translucent part 26 along a portion of the chromed visible surface 24 of the base 22 to define a first visible portion 28 of the chromed visible surface 24 not covered by the translucent part 26 and a second visible portion 30 of the chromed visible surface 24 covered by but visible through the translucent material 26. The chrome layer may be disposed on less or more than the entire visible surface of the base part 22. The second visible portion 30 of the chromed visible surface 24 can still be viewed through the translucent material. As mentioned above, the segregation or creation of the first and second visible portions 28, 30 of the chromed visible surface 24 by the translucent part 26 allows the chrome layer to be freely exposed along the first visible portion 28 while simultaneously allowing light to pass through the translucent part 26 and reflect off the second visible portion 30 of the chromed visible surface 24. As also mentioned above, the three-dimensional texture 32 disposed on one of the second visible portion 30 of the chromed visible surface 24 and the translucent material 26 redirects the light that is reflected off of the second visible portion 30 of the chromed visible surface 24. Thus, two separate aesthetic effects, characteristics, or functions are provided to the decorative assembly 20 by the chromed visible surface 24. In one instance, the first visible portion 28 of the chromed visible surface 24 is freely visible or exposed on the decorative assembly 20 and thus freely reflects light which is uninhibited or uninterrupted by another surface or part, such as the translucent material 26. In a second instance, the second visible portion 30 of the chromed visible surface 24 reflects light that has passed through the translucent part 26, which is then redirected off the three-dimensional texture 32 to contribute an aesthetic characteristic to the decorative assembly 20 which is separate and distinct from the aesthetic characteristic contributed by the first visible portion 28.

The method of manufacturing a decorative assembly 20 further includes the step of 110 interlocking the base 22 and the translucent material 26 with one another to securely assemble the decorative assembly 20. In the preferred aspect, the interlocking step can be accomplished using any one of snap tabs, glue, a sonic weld, double-sided tape, buckle clips, heat stakes, a rib with metal clips, hoops, or the like. However, any other interlocking means can utilized to interlock the base 22 and the translucent part 26 without departing from the scope of the invention.

Obviously, many modifications and variations of the present disclosure are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims.

What is claimed is:

1. A decorative assembly for an automobile comprising:
a base part having a visible surface;
a chrome layer disposed on all of said visible surface of said base part to create a chromed visible surface;
a translucent part overlaying a portion of said chromed visible surface of said base part to define a first visible portion of said chromed visible surface not covered by said translucent part and a second visible portion of said chromed visible surface covered by but visible through said translucent part for allowing light to pass through said translucent part and reflect off said second visible portion of said chromed visible surface, said translucent part including a bottom portion and a top portion opposite said bottom portion, said bottom portion facing said second visible portion and extending in spaced and adjacent relationship with said second visible portion; and
wherein at least one of said second visible portion of said chromed visible surface or said translucent part includes a three-dimensional texture, and wherein said first visible portion of said chromed visible surface is free of said three-dimensional texture to provide a first aesthetic characteristic, wherein said three-dimensional texture is configured to redirect the light reflected off said second visible portion of said chromed visible surface and create a second aesthetic characteristic for said second visible portion that is separate and distinct from said first aesthetic characteristic of said first visible portion.

2. A decorative assembly as set forth in claim 1 further comprising:
said three-dimensional texture comprising a textured surface disposed along one of said top and bottom portion of said translucent part.

3. A decorative assembly as set forth in claim 1 wherein said three-dimensional texture comprises a textured surface disposed along said second visible portion of said chromed visible surface.

4. A decorative assembly as set forth in claim 1 further comprising an interlocking means to establish interlocking relationship between said base part and said translucent part.

5. A decorative assembly as set forth in claim 4 wherein said interlocking means comprises at least one of snap tabs, glue, double-sided tape, buckle clips, heat stakes, a rib with metal clips, or hoops.

6. A decorative assembly as set forth in claim 1 further comprising:
said base part including a channel extending from a first channel end to a second channel end;
said base part including a pair of raised edges each extending between said first and second channel end in parallel and raised relationship to said channel; and
said translucent part laying within said channel and disposed between said ends and said edges to define said first visible portion of said chrome layer disposed along the raised edges of the base and said second visible portion of said chrome layer disposed along said channel.

7. A decorative assembly as set forth in claim 1 further comprising:
said base part including a plurality of bars extending in spaced relationship to one another from a first bar end to a second bar end to define a top side and a front side along each of said bars; and
said translucent part disposed along said top side of said bars between said first end and said second end to define said first visible portion of said chromed visible surface disposed along said front side of said plurality of bars and said second visible portion of said plurality of bars disposed along said top side of said plurality of bars.

8. A decorative assembly as set forth in claim 1 wherein said base part comprises a plastic material.

9. A decorative assembly as set forth in claim 8 wherein said plastic material comprises at least one of acrylonitrile butadiene styrene (ABS) or a polycarbonate-acrylonitrile butadiene styrene blend (PC/ABS).

10. A decorative assembly as set forth in claim 1 wherein said translucent part is comprised of at least one of polycarbonate or acrylic material.

11. A decorative assembly as set forth in claim 1 wherein said translucent part comprises a colored translucent part.

12. A method of manufacturing a decorative assembly for an automobile comprising:
injection molding a base part to create a visible surface;
plating a chrome layer along all of the visible surface of the base to create a chromed visible surface; and
overlaying a translucent part in spaced and adjacent relationship along a portion of the chromed visible surface of the base to define a first visible portion of the chromed visible surface not covered by the translucent material and a second visible portion of the chromed visible surface covered by but visible through the translucent part for allowing the chrome layer to be freely exposed along the first visible portion and for allowing light to pass through the translucent material and reflect off the second visible portion of the chromed visible surface;
said translucent part including a bottom portion and a top portion opposite said bottom portion, said bottom portion facing said second visible portion;
providing at least one of the second visible portion of the chromed visible surface and the translucent material with a three-dimensional texture to redirect the light reflected off of the second visible portion of the chromed visible surface.

13. A method of manufacturing a decorative assembly as set forth in claim 12 further comprising: texturing the translucent part to define the three-dimensional texture of the decorative assembly.

14. A method of manufacturing a decorative assembly as set forth in claim 12 further comprising: texturing the second visible portion of the chromed visible surface to define the three-dimensional texture of the decorative assembly.

15. A method of manufacturing a decorative assembly as set forth in claim 12 further comprising:
interlocking the base and the translucent material with one another to securely assembly the decorative assembly.

16. A method of manufacturing a decorative assembly as set forth in claim 12 further comprising:
injection molding the translucent part prior to said overlaying step.

17. A method of manufacturing a decorative assembly as set forth in claim 16 further comprising:
providing a three-dimensional pattern to a mold prior to the step of molding the base part or the translucent part.

18. A decorative assembly as set forth in claim 1 wherein said translucent part is a self supporting part with an air gap formed between said translucent part and said base part.

* * * * *